April 30, 1946.                C. N. HAY                 2,399,547
                       ARTICLE HANDLING DEVICE
                        Filed April 10, 1945
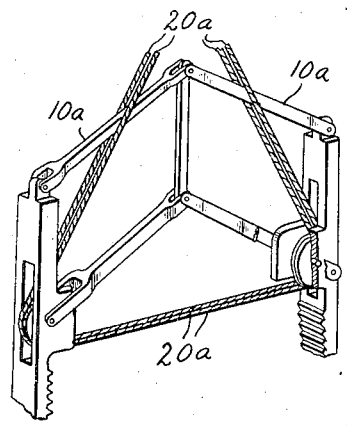
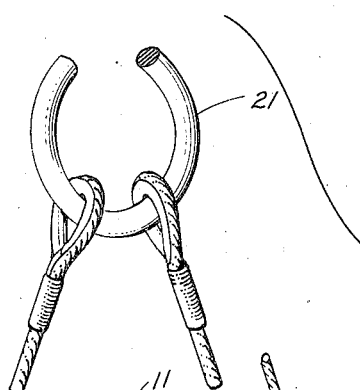
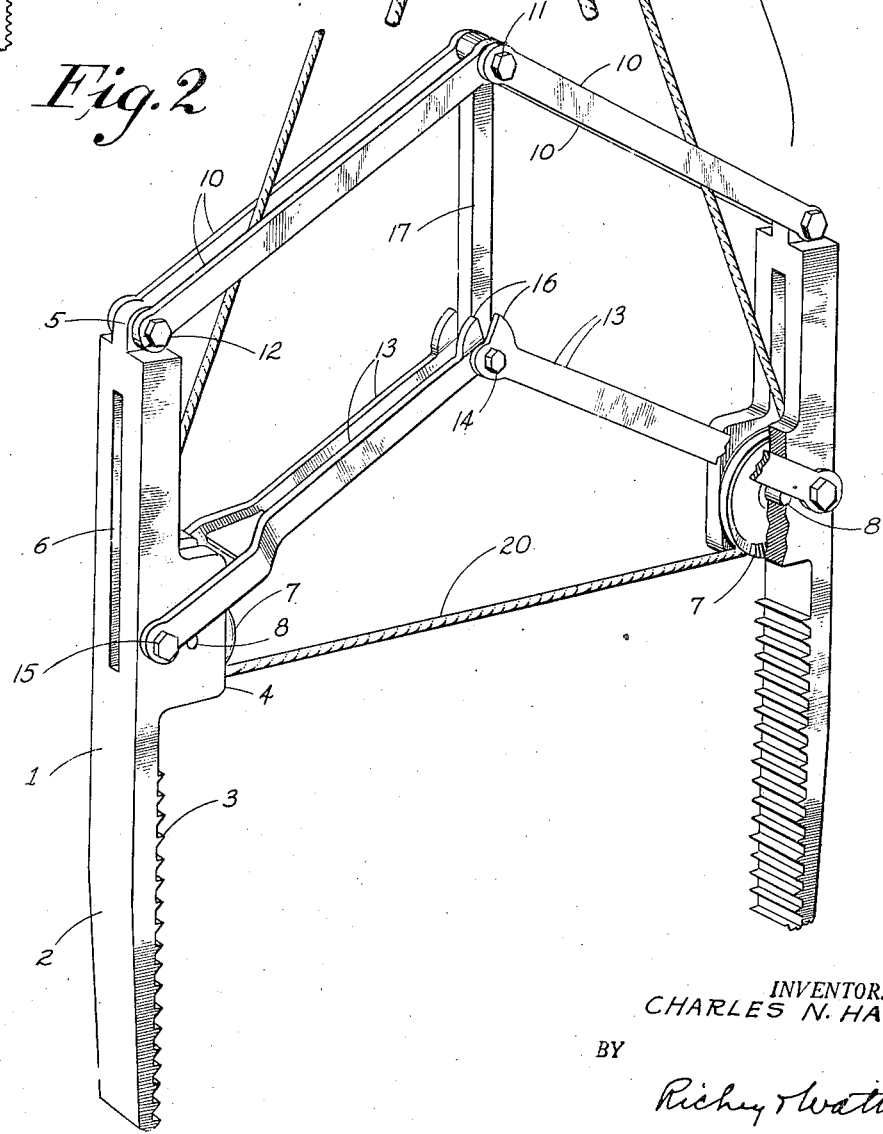
INVENTOR.
CHARLES N. HAY
BY
Richey & Watts
ATTORNEYS Patented Apr. 30, 1946

2,399,547

UNITED STATES PATENT OFFICE 2,399,547

ARTICLE HANDLING DEVICE

Charles N. Hay, San Diego, Calif., assignor to The American Mono Rail Company, Cleveland, Ohio, a corporation of Ohio Application April 10, 1945, Serial No. 587,573

4 Claims. (Cl. 294—112)

The present invention relates generally to the art of handling articles and particularly to a new cable operated device suited especially for the handling of boxes and crates.

Article handling devices, often commonly referred to as "grabs" which have been proposed heretofore, have not been entirely satisfactory for handling boxes and crates of various sizes and shapes. Many of these devices exerted greater pressure on narrow articles than on wider articles; and since the wider articles are usually stronger and heavier than the narrower articles, hoisting devices which could grip the wider, stronger articles with sufficient force to lift and carry them tended to crush the narrower, weaker articles. Furthermore, prior hoisting devices were not suited for lifting an article, such as a crate or box, which was closely adjacent other such articles, or for depositing such an article closely adjacent to similar articles.

The present invention aims to provide an article handling device or grab which is suited to the handling of articles such as boxes and crates of various widths, will exert greater compressive forces on wider articles than on narrower ones, will remove such articles from or place them in close proximity to other articles, and is light, strong, easy to construct and operate and is composed of a simple, positive acting combination of parts. These aims are achieved by the present invention which is described in this specification and is illustrated in the drawing accompanying and forming a part of this specification.

Fig. 1 is a perspective view of one form of apparatus embodying the present invention;

Fig. 2 is a perspective view of a modified form of the present invention.

The device shown in Fig. 1 comprises a pair of horizontally spaced, vertical jaws, means for maintaining those jaws in parallelism, and means for moving the jaws toward each other and maintaining the device in vertical position during the lifting, transporting and lowering of an article gripped between the jaws.

Each of the jaws 1 of Fig. 1 includes a lower, article engaging portion 2 which is thin and narrow and tapered at its lower end and preferably has short teeth 3 projecting from its inner surface, a pulley carrying mid-portion 4 projecting from the inner surface of the jaw, and a link carrying upper end or top portion 5. The jaws 1 are provided with apertures 6 which extend from adjacent to the top portions into the pulley carrying mid-portions. Peripherally grooved pulleys 7 are positioned in the apertures in mid-portion 4 and are mounted for rotation on axles 8 extending thru the mid-portions.

Pairs of parallel bars constituting upper links 10 are pivoted together at their adjacent ends, as by pivot 11, and are pivoted to the top portions of jaws 1, as by pivot 12. Pairs of bars constituting lower links 13 are pivoted together at their adjacent ends, as by pivot 14, and are pivoted at their remote ends to the mid-portions 4 of bars 1, as by pivots 15. A link 17 disposed parallel to jaws 1 connects pivots 11 and 14 and insures that the pairs of upper and lower links 10 and 13 between it and either one of jaws 1 will be maintained in parallelism. Link 17 in cooperation with the sets of links 10 and 13 serves to maintain jaws 2 in parallelism with each other and to permit one jaw to shift its position vertically relative to the other jaw while maintaining the two jaws in parallelism. If desired, the adjacent ends of one set of links 10 or 13 may be provided with stops to limit the extent of movement of one set relative to the other. Such stop means is illustrated in the figure by projections 16 at the adjacent ends of each of links 13. The opposed surfaces of stops 16 are so shaped that they engage each other before their links may be brought down into a substantially straight line or reach a dead center.

A cable 20 extends downwardly from support 21 between one pair of links 10 around the outer and lower surface of one pulley 7, thence horizontally across to the under side of the other pulley 7, up around its outer side and between the other set of links 10 to support 21. Thus cable 20 is arranged in a triangular shape with the pulleys lying in the base angles, the support 21 being at the apex and the sides extending between the bars of links 10.

When support 21 is moved upwardly, tension is exerted on the downwardly inclined reaches of cable 20 and jaws 1 are impelled toward each other with resultant upward movement of pivots 11 and 14 and corresponding pivoting action of links 10 and 13. Since the downwardly extending reaches of cable 20 pass between the pairs of links 10, the cable serves to maintain the jaws of the hoisting device in substantially vertical position during the movement of the jaws toward each other and while an article is being gripped between those jaws. Since the horizontal components of the forces applied to cable 20 by support 21 are greatest when the downwardly extending reaches of the cable make the smallest included angles with the horizontal reach thereof and decrease as those angles increase, the forces tending to move the jaws toward each other are greatest when the jaws are the maximum distance apart and decreases as that distance decreases. For these reasons, the jaws of the present invention are urged toward each other with less force when they are gripping a narrow article than when a wider article is between the jaws. This is a distinct advantage because the narrower articles, particularly when they are boxes or crates, are usually weaker and less able to withstand laterally applied forces without breaking or crushing than are the wider and usually stronger boxes or crates.

The article engaging lower portions 2 of the jaws are, as above mentioned, relatively thin and narrow. Since they occupy such small spaces they may be placed on opposite sides of a box or crate which is closely adjacent to other articles, as in a stack. This is a distinct advantage for, to economize space, boxes or crates are desirably placed close to one another. While it will be understood that the width and thickness of portions 2 of the jaws may be varied, depending on the strength desired, illustrative dimensions may be specified for jaws which have been found to be satisfactory. In one instance the upper part of portion 2, exclusive of projections 3 which were about ¼" in length, was about ⅝" and tapered to about ¼" at the extreme lower end; and portion 2 was about ⅞" wide and about 8" long from its lower end to the bottom of portion 4.

As will be noted in Fig. 1, the center lines of pivots 15 are in the horizontal plane which includes the center lines of axles 8 of pulleys 7 and near the outer edges of pulleys 7. This location of pivots 15 is of advantage because it provides moment arms about those pivots which prevent any possibility of malfunctioning of the device due to dead centering of the links. When the pivot points and pulley axes are so located, stops 16 may be omitted, if desired.

It will be understood by those skilled in the art that various changes may be made in the modification of the invention disclosed in Fig. 1 without departing from the spirit of the invention. For example, as shown in Fig. 2, the pair of bars constituting links 10 may be replaced by single bars 10a bifurcated at their ends, in which case pulleys 7 may be provided with double peripheral grooves and cable 20 may be replaced by two cables 20a with the inclined reaches of the cables lying on opposite sides of the upper single bars 10a to preserve the device in vertical position during the handling operation. Other obvious changes, not involving invention, may also be made and the various illustrated parts may be replaced by their mechanical equivalents.

Having thus described the invention so that others skilled in the art may be able to understand and practice the same, I state that what I desire to secure by Letters Patent is defined in what is claimed.

What is claimed is:

1. An article handling device comprising vertical, parallel, spaced jaws having opposed, article engaging lower portions, pulley carrying mid-portions and top portions, means for maintaining said jaws in parallel position, said means comprising upper links pivoted together at their adjacent ends and pivoted at their remote ends to the top portions of the jaws, lower links pivoted together at their adjacent ends and pivoted at their remote ends to the mid-portions of the jaws and a vertical link pivotally associated with said upper and lower links, and means for moving said jaws toward each other and maintaining the jaws in substantially vertical position, said means comprising pulleys rotatably mounted in the mid-portions of said jaws and cable means extending beneath and on the outer sides of said pulleys and upwardly alongside of said upper links to a support above the space between said jaws.

2. An article handling device comprising vertical, parallel, spaced jaws having their narrow opposed, article engaging lower portions, apertured, pulley carrying mid-portions and top portions, means for maintaining said jaws in parallel position, said means comprising pairs of parallel bars constituting upper links pivoted together at their adjacent ends and pivoted at their remote ends to the top portions of the jaws, lower links pivoted together at their adjacent ends and pivoted at their remote ends to the mid-portions of the jaws and a vertical link connected to the pivots at the adjacent ends of the upper and lower links, and means for moving said jaws toward each other, and maintaining the device in vertical position during lifting, said means comprising pulleys rotatably mounted in said apertures in the mid-portions of said jaws and a cable extending beneath and on the outer sides of said pulleys and upwardly between the bars of said upper links to a support above said vertical link.

3. An article handling device comprising vertical, parallel, spaced jaws having opposed, article engaging lower portions, pulley carrying mid-portions and top portions, means for maintaining said jaws in parallel position, said means comprising upper links pivoted together at their adjacent ends and pivoted at their remote ends to the top portions of the jaws, lower links pivoted together at their adjacent ends and pivoted at their remote ends to the mid-portions of the jaws and a vertical link pivotally associated with said upper and lower links, and means for moving said jaws toward each other, and maintaining the device in vertical position during lifting, said means comprising pulleys rotatably mounted in the mid-portions of said jaws, the longitudinal center line of said pulley lying in the plane of and between the longitudinal center lines of the pivotal connections of said lower links to said jaws, and cable means extending beneath and on the outer sides of said pulleys and upwardly alongside of said upper links to a support above the space between said jaws.

4. An article handling device comprising two vertical, parallel, horizontally spaced, article engaging jaws, upper and lower links connected to each jaw by vertically spaced pivots, a vertical link, and pivots connecting the ends of said vertical link to the adjacent ends of said upper and lower links, peripherally grooved pulleys rotatably mounted in the jaws adjacent to the pivotal connections of the lower links to the jaws, and cable means arranged in a triangular shape with said pulleys being at its base angles, its apex being at an overhead support, and its inclined sides cooperating with said upper links to maintain said jaws in substantially vertical position.

CHARLES N. HAY.